BEST AVAILABLE COPY

W. T. CARROLL,

Assignor to G. & W. F. Draper.

RINGS FOR SPINNING-MACHINES.

No. 7,575. Reissued March 27. 1877.

Attest:

L. H. Latimer.

W. J. Pratt.

Inventor

George Draper & William F. Draper
Assignees of William T. Carroll
per Crosby & Gregory attys.

N. PETERS, PHOTO-LITHOGRAPHER, WASHINGTON, D. C.

UNITED STATES PATENT OFFICE

WILLIAM T. CARROLL, OF WORCESTER, ASSIGNOR TO GEORGE DRAPER AND WILLIAM F. DRAPER, OF HOPEDALE, MASSACHUSETTS.

IMPROVEMENT IN RINGS FOR SPINNING-MACHINES.

Specification forming part of Letters Patent No. 78,427, dated June 2, 1868; reissue No. 3,714, dated November 9, 1869; reissue No. 7,575, dated March 27, 1877; application filed July 19, 1875.

*To all whom it may concern:*

Be it known that WILLIAM T. CARROLL, formerly of Medway, Massachusetts, but now of Worcester, Massachusetts, did invent Improvements in Rings for Ring-Spinning Machines, of which the following is a specification:

This invention relates to rings for ring-spinning machines; and consists in the combination of a holder having a flange adapted to rest on the surface of a ring-rail with a ring constructed as hereinafter described, so that it will be sustained by such holder, and entirely above the surface of the ring-rail, and with screws adapted to enter holes in the holder, whereby the ring may be centered for the proper reception and operation of the spindle.

Figure 1:
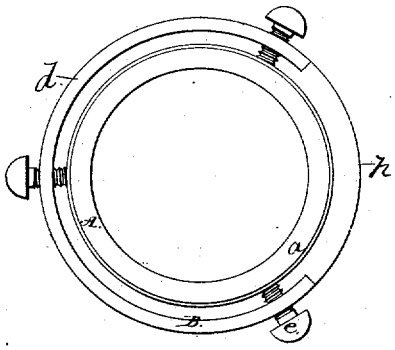
Figure 3:
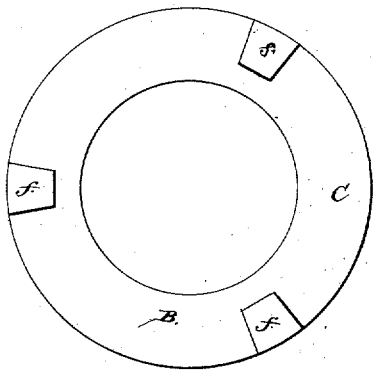
Figure 2:
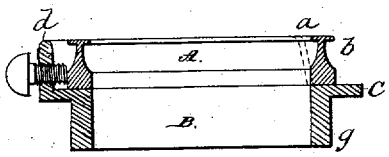

Figure 1 is a top view, and Fig. 2 a transverse section, of a ring, and one construction of its holder or supporter, as made in accordance with the invention. Fig. 3 is a top view, and Fig. 4 a transverse section, of a ring holder or supporter, having a form somewhat different from that shown in Figs. 1 and 2, yet in accordance with this invention.

The object of the invention is to support the ring, and enable it to be adjusted or made concentric with reference to the spindle, should the latter be or get out of its normal position.

The ring is made separate from the part which supports it above the ring-rail.

As shown in the drawing, no part of the ring proper extends into or below the top of the ring-rail, the ring carrier or holder being adapted to rest on the surface of the ring-rail, and the neck on the holder to extend into the rail. The ring, as represented, is made without the usual neck to enter the rail, and rests or is supported on or in, and extends above, the holder, and there is projected upward from the latter a flange to go around the ring, and receive screws screwed radially through it, and against the outer periphery of the ring, such screws being arranged at, or about at, equal distances apart, whereby the ring may be adjusted with reference to the opening in the ring-rail, in which the spindle rotates to centralize the ring and spindle.

A denotes the ring, having at its top a race, *a*, with its face arranged in a horizontal plane, and on which the traveler moves, as usual, and the lower end *b* of the ring, which is not provided, as usual, with a neck to extend into and below the ring-rail, is sustained by the holder B, so as to be entirely above the surface of the ring-rail.

This holder B has a flat part, *c*, which rests on the top of the ring-rail, and there rises from this part *c*, as shown in Figs. 1 and 2, a flange, *d*, through which are passed the screws *e*, which bear against the lower part *b* of the ring, confining it to the holder B, and adjusting its position concentrically with relation to the opening in the ring-rail through which the spindle is to extend and rotate.

Figure 4:
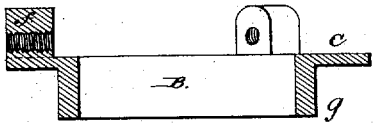

The lower part of this holder is shown as provided with a neck, *g*, which is to extend into the opening in the ring-rail. The flange *d* does not extend entirely about the holder, but an open space, *h*, is provided therein, as shown in Fig. 1, whereby access can be readily had to the traveler, and the open space also facilitates the removal of the ring, and is beneficial in other respects—as, for instance, when fibrous matters which may collect on the traveler are brought, during the rotation of the traveler, against the end of the flange, they will be removed, and the flange thereby becomes a traveler-clearer. Instead of this flange short posts or ears *f* may be extended from the flat part *c* of the holder, as shown in Figs. 3 and 4, they being adapted to receive the screws *e*, before mentioned.

The ring A, as constructed, can be produced much cheaper than the usual ring with a neck extended into the ring-rail, and with a shoulder to rest on the ring-rail.

Before this invention a necked ring, as shown in Patent No. 39,657, has been adjusted by means of screws passing through the ring-rail and bearing against the neck, and to apply such rings to an ordinary ring-rail the holes or spindle-passages had to be enlarged beyond the size of the ring-shank; but in this invention, when the ring is supported on a holder above the rail, the spindle-openings need not be enlarged, and the adjustable rings may be applied to any ordinary ring-rail.

We claim—

1. In combination, a ring-holder adapted to rest on the surface of a ring-rail, provided with spindle-openings, a ring sustained by the holder and movable above the surface of the ring-rail, and screws placed at opposite sides of the ring and holder, whereby the ring may be held in adjusted position above the ring-rail, and with reference to the spindle-opening in the ring-rail, for the purpose set forth.

2. The combination, with the ring, of the holder provided with a neck, and adapted to be placed on and within the ring-rail, and with the flange, posts or ears, and adjusting-screws, substantially as and for the purpose described.

3. The holder B, provided with the flange *d*, the open space *h*, and screws *e e*, combined and adapted to operate in connection with the ring A, as set forth.

4. A spinning-ring supported by the ring-rail, and laterally adjustable above the surface of the rail with reference to the spindle-openings therein, substantially as and for the purposes above described.

5. In a ring-spinning machine having a ring-rail provided with spindle-openings, a ring adapted to be adjusted laterally entirely above the upper surface of the ring-rail, combined with mechanism to hold it in adjusted position thereon, for the purpose specified.

In testimony whereof we have signed our names to this specification in the presence of two subscribing witnesses.

GEORGE DRAPER.
WM. F. DRAPER.

Witnesses:
E. D. BANCROFT,
W. S. BANCROFT.